US009619786B2

(12) United States Patent
Cheng et al.

(10) Patent No.: US 9,619,786 B2
(45) Date of Patent: Apr. 11, 2017

(54) SHAPE DRIVEN SCHEDULING OF MULTIPLE EVENTS FOR A TASK IN A CALENDARING AND SCHEDULING SYSTEM

(75) Inventors: Li-Te Cheng, Malden, MA (US); Paul B. Moody, Hyde Park, VT (US); Dawei Shen, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 1717 days.

(21) Appl. No.: 13/016,227

(22) Filed: Jan. 28, 2011

(65) Prior Publication Data
US 2012/0198377 A1   Aug. 2, 2012

(51) Int. Cl.
*G06Q 10/10*   (2012.01)
(52) U.S. Cl.
CPC ................. *G06Q 10/109* (2013.01)
(58) Field of Classification Search
CPC .................................... G06Q 10/109
USPC .......................................... 715/772
See application file for complete search history.

(56) References Cited

U.S. PATENT DOCUMENTS

| 5,570,109 | A  | * | 10/1996 | Jenson .......................... 715/823 |
| 2002/0010610 | A1 | * | 1/2002 | Jacobs et al. ..................... 705/8 |
| 2003/0105657 | A1 |  | 6/2003 | Nandigama |
| 2007/0233534 | A1 |  | 10/2007 | Martin |
| 2008/0301565 | A1 | * | 12/2008 | Abhyanker .................. 715/744 |
| 2010/0106627 | A1 |  | 4/2010 | O'Sullivan |

* cited by examiner

*Primary Examiner* — Jennifer To
*Assistant Examiner* — Ashley Fortino
(74) *Attorney, Agent, or Firm* — Steven M. Greenberg, Esq.; CRGO Law

(57) ABSTRACT

Embodiments of the present invention provide a method, system and computer program product for shape based scheduling of events for a task in a calendaring and scheduling (C&S) system. In an embodiment of the invention, a method for shape based scheduling of events for a task in a C&S system is provided. The method includes defining a shape for a range of days in a calendar view of a C&S system executing in memory of a host computer. The method further includes superimposing the shape over the range of days in the calendar view. The method yet further includes determining a block of time for each of the days in the range upon which a portion of the shape has been superimposed. Finally, the method includes scheduling at least one event for each block of time determined for each of the days in the range upon which a portion of the shape has been superimposed.

12 Claims, 2 Drawing Sheets

SHAPE DRIVEN SCHEDULING OF MULTIPLE EVENTS FOR A TASK IN A CALENDARING AND SCHEDULING SYSTEM

BACKGROUND OF THE INVENTION

Field of the Invention

The present invention relates to the field of calendaring and scheduling and more particularly to calendar entry management in a calendaring and scheduling (C&S) system.

Description of the Related Art

Calendaring systems have formed the core component of personal information management software and firmware applications for decades. Initially, a mere calendar display, modern calendaring systems provide scheduling and alarm functions in addition to full integration with contact management, time entry, billing and project management applications. The typical calendaring application minimally provides a mechanism for scheduling an event to occur on a certain date at a certain time. Generally, the event can be associated with a textual description of the event. More advanced implementations also permit the association of the scheduled event with a particular contact, a particular project, or both. Furthermore, most calendar applications provide functionality for setting an alarm prior to the occurrence of the event, as well as archival features.

Several software products include support for Calendaring & Scheduling (C&S). Known C&S products include Lotus™ Notes™, Microsoft™ Outlook™, and web-based products like Yahoo!™ Calendar™. These products allow one to manage personal events including appointments and anniversaries. C&S products also typically allow one to manage shared events, referred to generally as meetings. Electronic C&S software allows a group of people to negotiate around the scheduling of a proposed event such as a meeting, with the goal of selecting a time that allows most of the group to attend.

Of note, generally two types of events can be scheduled in a C&S system: a stand-alone event and a repeating event. In the former circumstance, the event is set for a single date and time range, while in the latter circumstance, the event is set to repeat at specified intervals for a duration of time. Further, in the latter circumstance a change to the event can be applied onto for a selected instance of the repeating event, or for all instances. In this regard, a change in duration of a selected instance of the repeating event can be applied only to the selected instance of the repeating event, or to all repeating events. However, when a change is applied only to a selected instance of the repeating event, no other changes are applied to other instances of the repeating event in consequence of the change to the selected instance of the repeating event.

Advanced forms of the C&S system provide for the aggregation of different events for a single task or activity. In this regard, multiple different events can be associated with a single task, such as a sequence of meetings over a course of days or even weeks. Yet, unless the meetings of a single task are grouped together as a repeating event, changes to one of the meetings will not impact others of the meetings of the single task. Conversely, if the meetings of the single task are grouped together as a repeating event, a change to one of the meetings can only be applied individually, or to the entire sequence of meetings uniformly.

BRIEF SUMMARY OF THE INVENTION

Embodiments of the present invention address deficiencies of the art in respect to calendaring events in a C&S system and provide a novel and non-obvious method, system and computer program product for shape based scheduling of events for a task in a C&S system. In an embodiment of the invention, a method for shape based scheduling of events for a task in a C&S system is provided. The method includes defining a shape for a range of days in a calendar view of a C&S system executing in memory of a host computer. The method further includes superimposing the shape over the range of days in the calendar view. The method yet further includes determining a block of time for each of the days in the range upon which a portion of the shape has been superimposed. Finally, the method includes scheduling at least one event for each block of time determined for each of the days in the range upon which a portion of the shape has been superimposed.

In another embodiment of the invention, a C&S data processing system can be provided. The system can include a host server with at least one processor and memory configured for communicative coupling to different computers over a computer communications network. The system further can include a C&S system executing in the memory of the host server and providing a calendar view of different days. Finally, a shape based scheduling module can be coupled to the C&S system. The module can include program code enabled to define a shape for a range of the days in the calendar view, such as a polygon, or more specifically a triangle. The program code additionally can be enabled to superimpose the shape over the range of days in the calendar view, to determine a block of time for each of the days in the range upon which a portion of the shape has been superimposed, and to schedule at least one event for each block of time determined for each of the days in the range upon which a portion of the shape has been superimposed.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for shape based scheduling of events for a task in a C&S system. In accordance with an embodiment of the invention, a polygonal shape can be drawn across multiple dates of a calendar view in a C&S system. Thereafter, free time for each of the days included within the shape can be computed and one or more events can be created in the free time for each of the days and associated together as a single task. Optionally, a total duration of time consumed by the events of the single task can be determined as a time constraint for the single task and subsequent changes in a duration of time for a given one of the events can be accounted for with a corresponding adjustment to the durations of time established for others of the events of the single task to ensure that a total duration of time consumed by the events of the single task sum to the time constraint.

Figure 1:
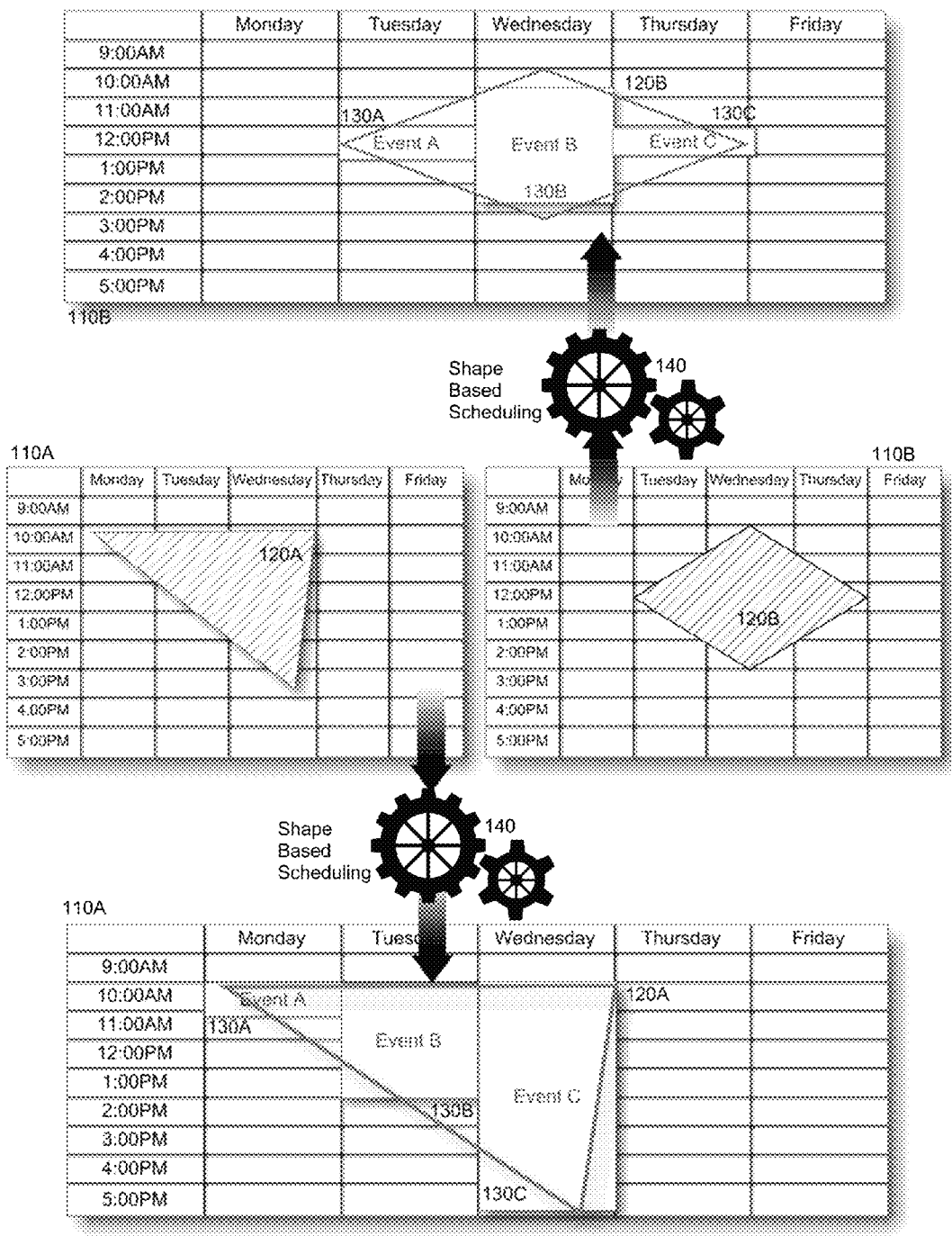
FIG. 1 is a pictorial illustration of a process for shape based scheduling of events for a task in a C&S system.

In further illustration, FIG. 1 pictorially shows a process for shape based scheduling of events for a task in a C&S system. As shown in FIG. 1, a calendar view 110A, 110B of a C&S system can provide a display of one or more days of the week, month, year or any portion thereof. A shape 120A, 120B, such as a polygon, can be drawn over one or more days in the calendar view 110A, 110B. Thereafter, shape based scheduling logic 140 can determine a portion of time enveloped by the shape 120A, 120B for each day in the calendar view 110A, 110B upon which the shape has been superimposed. Finally, one or more events 130A, 130B, 130C can be established on those portions of time enveloped by the shape 120A, 120B for corresponding days in the calendar view 110A, 110B enveloped by the shape 120A, 120B.

Figure 2:
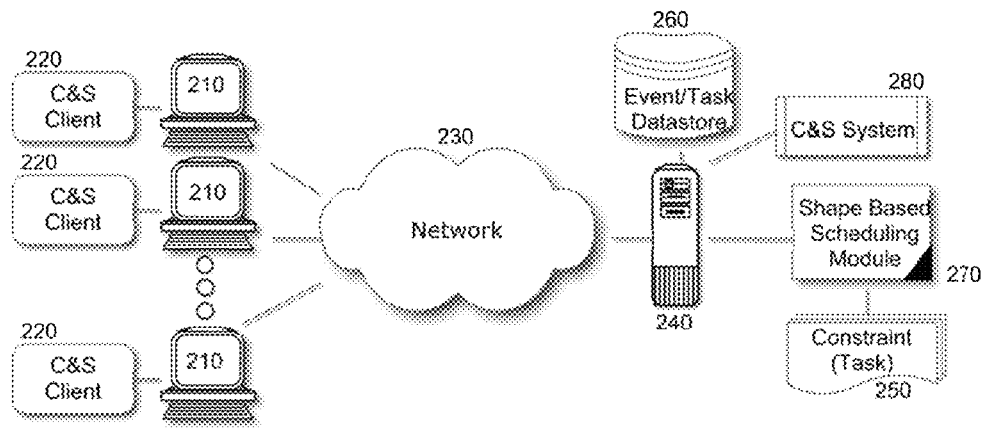
FIG. 2 is a schematic illustration of a C&S data processing system configured for shape based scheduling of events for a task in a C&S system; and, FIG. 3 is a flow chart illustrating a process for shape based scheduling of events for a task in a C&S system.

The process described in connection with FIG. 1 can be implemented in a C&S data processing system. In yet further illustration, FIG. 2 schematically shows a C&S data processing system configured for shape based scheduling of events for a task in a C&S system. The system can include a host server 240 with at least one processor and memory configured for coupling to multiple different computers 210 over a computer communications network 230. The host server 240 can support the execution of a C&S system 280 scheduling different events for a single task in an event/task data store 260 accessible by different users through respectively different C&S clients 220 executing in corresponding ones of the computers 210.

Of note, a shape based scheduling module 270 can be coupled to the C&S system 280 and can execute in the memory of the host server 240. The shape based scheduling module 270 can include program code that when executed by one or more processors of the host server 240 can define a shape such as a polygon for superimposition over different days of a calendar view of the C&S system 280. The program code further can be enabled to determine a duration of time enveloped by the shape for each day of the calendar view upon which the shape has been superimposed. The program code yet further can be enabled to establish different events for a single task for the duration of time determined for each day of the calendar view upon which the shape has been superimposed. Optionally, the total duration of time determined for the different events of the single task can be computed as a constraint 250 and adjustments or modifications to the duration of time for one of the events can be accounted for with a countervailing adjustment of the duration of time to one or more others of the events.

Figure 3:
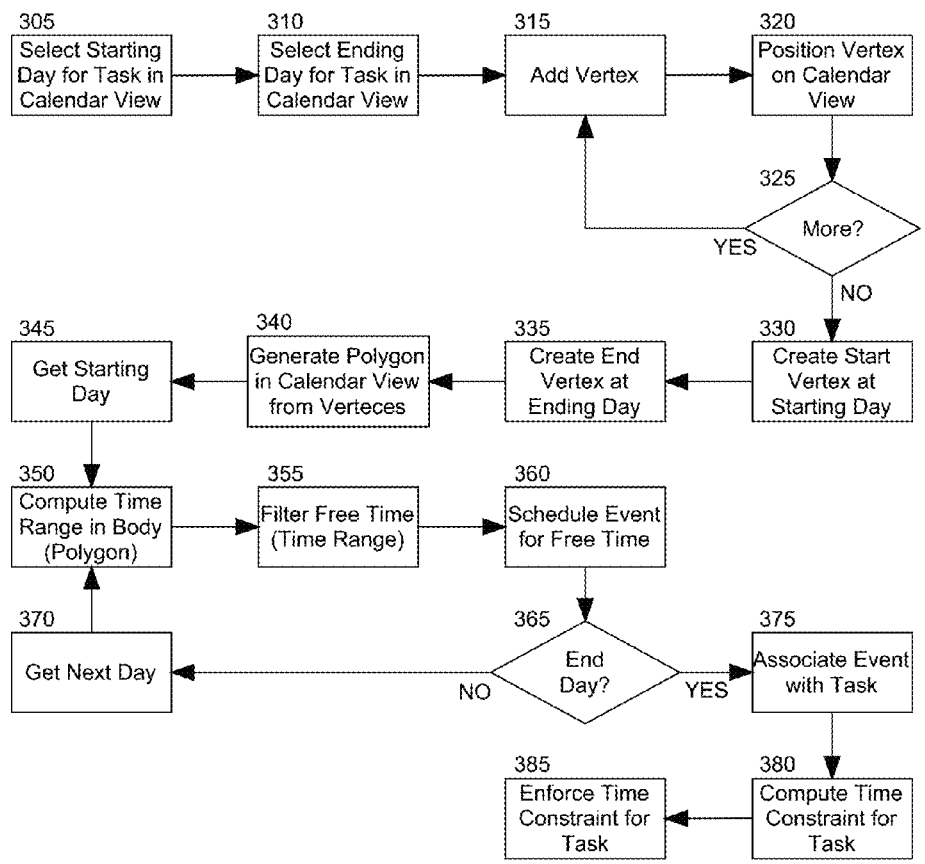

In even yet further illustration of the operation of the shape based scheduling module 270, FIG. 3 is a flow chart illustrating a process for shape based scheduling of events for a task in a C&S system. Beginning in block 305, a starting day in a calendar view of a C&S system can selected and in block 310 an ending day can be selected so as to define a range of days over which events are to be scheduled for a task. In block 315 a vertex can be added in the C&S system and positioned in block 320 at a point in the calendar view. In decision block 325, it can be determined if more vertices are to be defined and positioned in the calendar view. If so, the process can return to block 315. Otherwise, the process can proceed through block 330.

In block 330, a vertex can be created for the starting day of the range and in block 335 a vertex can be created as the ending day of the range. Thereafter, in block 340, a polygon can be created by connecting with lines each of the vertices and superimposed over the range in the calendar view. In block 345, the starting day can be selected for analysis and in block 350 a block of time enveloped by the polygon for the selected day can be determined. In block 355, the block of time can be filtered to reflect only free time not already scheduled with an event. In block 360 an event can be scheduled for each contiguous portion of the free time of the selected day. Subsequently, in decision block it can be determined whether the selected day also is the ending day. If not, the process can repeat through block 370 with the selection of the next day in the range. Otherwise, the process can continue through block 375.

In block 375, each event scheduled in block 360 can be associated with the single task and in block 380, a sum total of all time for the events of the single task can be computed as a time constraint for the single task. Thereafter, in block 385 the time constraint can be enforced with respect to any changes to any durations of time for any of the events of the single task so as to ensure that the sum total of all time for the events of the single task does not exceed the time constraint.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for shape based scheduling of events for a task in a calendaring and scheduling (C&S) system, comprising:
   adding a vertex on the calendar view of a calendar of a C&S system executing in memory of a host computer, and drawing lines on the calendar view of the calendar between the vertex on the calendar view, a start day displayed on the calendar view, and an end day also displayed on the calendar view, the addition of the vertex and drawing of lines defining a shape in the calendar of the calendar view;
   superimposing the shape in the calendar view;
   determining a range of days within the superimposed shape;
   determining a block of time for each of the days in the range upon which a portion of the shape has been superimposed;

scheduling at least one event for each block of time determined for each of the days in the range upon which a portion of the shape has been superimposed summing as a time constraint all blocks of time scheduled for each of the days in the range upon which a portion of the shape has been superimposed; and, responding to a modification of one of the blocks of time for one of the days in the range with a countervailing modification of other blocks of time for others of the days in the range to ensure that a sum of all blocks of time for the days in the range does not exceed the time constraint despite the modification.

2. The method of claim 1, wherein scheduling at least one event for each block of time determined for each of the days in the range upon which a portion of the shape has been superimposed, comprises scheduling at least one event for each block of time comprising free time and determined for each of the days in the range upon which a portion of the shape has been superimposed.

3. The method of claim 1, wherein the shape is a polygon with at least two vertices positioned at a starting day of the range and an ending day of the range in the calendar view.

4. The method of claim 3, wherein the polygon is a triangle.

5. A calendaring and scheduling (C&S) data processing system comprising:
 a host server with at least one processor and memory configured for communicative coupling to a plurality of different computers over a computer communications network;
 a C&S system executing in the memory of the host server and providing a calendar view of a calendar of a plurality of days; and,
 a shape based scheduling module coupled to the C&S system, the module comprising program code enabled to add a vertex on the calendar view of the calendar and drawing lines on the calendar view of the calendar between the vertex on the calendar view, a start day displayed on the calendar view and an end day also displayed on the calendar view, the addition of the vertex and the drawing of the lines defining a shape in the calendar of the calendar view, to superimpose the shape in the calendar view, to determine a range of days with the superimposed shape, to determine a block of time for each of the days in the range upon which a portion of the shape has been superimposed, to schedule at least one event for each block of time determined for each of the days in the range upon which a portion of the shape has been superimposed, to sum as a time constraint all blocks of time scheduled for each of the days in the range upon which a portion of the shape has been superimposed; and, to respond to a modification of one of the blocks of time for one of the days in the range with a countervailing modification of other blocks of time for others of the days in the range to ensure that a sum of all blocks of time for the days in the range does not exceed the time constraint despite the modification.

6. The system of claim 5, wherein block of time for each of the days includes only free time and excludes time already scheduled.

7. The system of claim 5, wherein the shape is a polygon.

8. The system of claim 5, wherein the polygon is a triangle.

9. A computer program product for shape based scheduling of events for a task in a calendaring and scheduling (C&S) system, the computer program product comprising:
 a non-transitory computer readable storage memory device having computer readable program code embodied therewith, the computer readable program code comprising:
 computer readable program code for adding, a vertex on the calendar view of a calendar of a C&S system executing in memory of a host computer, and drawing lines on the calendar view of the calendar between the vertex on the calendar view, a start day displayed on the calendar view, and an end day also displayed on the calendar view, the addition of the vertex and drawing of lines defining a shape in the calendar of the calendar view;
 computer readable program code for superimposing the shape in the calendar view; computer readable program code for determining a range of days within the superimposed shape;
 computer readable program code for determining a block of time for each of the days in the range upon which a portion of the shape has been superimposed;
 computer readable program code for scheduling at least one event for each block of time determined for each of the days in the range upon which a portion of the shape has been superimposed;
 computer readable program code for summing as a time constraint all blocks of time scheduled for each of the days in the range upon which a portion of the shape has been superimposed; and,
 computer readable program code for responding to a modification of one of the blocks of time for one of the days in the ran e with a countervailing modification of other blocks of time for others of the days in the range to ensure that a sum of all blocks of time for the days in the range does not exceed the time constraint despite the modification.

10. The computer program product of claim 9, wherein the computer readable program code for scheduling at least one event for each block of time determined for each of the days in the range upon which a portion of the shape has been superimposed, comprises computer readable program code for scheduling at least one event for each block of time comprising free time and determined for each of the days in the range upon which a portion of the shape has been superimposed.

11. The computer program product of claim 9, wherein the shape is a polygon with at least two vertices positioned at a starting day of the range and an ending day of the range in the calendar view.

12. The computer program product of claim 11, wherein the polygon is a triangle.

* * * * *